(12) United States Patent  
Eldar et al.

(10) Patent No.: US 9,558,560 B2  
(45) Date of Patent: Jan. 31, 2017

(54) CONNECTED COMPONENT LABELING IN GRAPHICS PROCESSORS

(71) Applicant: Intel Corporation, Santa Clara, CA (US)

(72) Inventors: Avigdor Eldar, Jerusalem (IL); Noam Teomim, Jerusalem (IL); Alexandra Manevitch, Jerusalem (IL); Amos Goldman, Jerusalem (IL); Liad Aben Zour, Jerusalem (IL); Orly Weisel, Elazar (IL); Raizy Kellerman, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 190 days.

(21) Appl. No.: 14/210,585

(22) Filed: Mar. 14, 2014

(65) Prior Publication Data

US 2015/0262369 A1    Sep. 17, 2015

(51) Int. Cl.
  *G06T 7/00* (2006.01)
  *G06K 9/00* (2006.01)

(52) U.S. Cl.
  CPC ......... *G06T 7/0081* (2013.01); *G06K 9/00973* (2013.01); *G06T 7/0093* (2013.01); *G06T 2207/20141* (2013.01); *G06T 2207/30201* (2013.01)

(58) Field of Classification Search
  None
  See application file for complete search history.

(56) References Cited

U.S. PATENT DOCUMENTS 7,526,634 B1    4/2009    Duluk et al.
2013/0198759 A1    8/2013    Shah et al.

FOREIGN PATENT DOCUMENTS

TW    201351290 A    1/2013

OTHER PUBLICATIONS

Mehta, S., Misra, A., Singhal, A., Kumar, P., Mittal, A., Palaniappan, K.: Parallel implementation of video surveillance algorithms on GPU architectures using CUDA. In: 17th IEEE Int. Conf. Advanced Computing and Communications, ADCOM (2009).*

Kumar, Praveen, et al. "Real-time moving object detection algorithm on high-resolution videos using GPUs." Journal of Real-Time Image Processing (2013): 1-17.*

Oliveira, V., Lotufo, R.A.: A study on connected components labeling algorithms using GPUs. XXIII Sibgrapi, Graphics, Patterns and Images (2010).*

(Continued)

*Primary Examiner* — Vu Le
*Assistant Examiner* — Tracy Mangialaschi
(74) *Attorney, Agent, or Firm* — Jordan IP Law, LLC

(57) ABSTRACT

Systems and methods may provide for obtaining data associated with an image and using a plurality of threads in a graphics processor to conduct a single instruction multiple data (SIMD) scan of the data. Additionally, systems and methods may provide for generating a plurality of connection tables corresponding to the plurality of threads based on the SIMD scan. In one example, a plurality of threads in the graphics processor are used to conduct a single phase merge of the plurality of connection tables onto a global connected components labeling (CCL) table for the image.

16 Claims, 10 Drawing Sheets

(56) References Cited

OTHER PUBLICATIONS

Stava et al., "Connected Component Labeling in CUDA", Chapter 35 of GPU Computing Gems, Emerald Edition, Elsevier, 2011, 19 pages.
Wu et al., "Optimizing Two-Pass Connected-Component Labeling Algorithms", Jun. 2009, 17 pages.

* cited by examiner

64 ⟶

| Case 1: | fg_mask | | | | | | | | | labels | | | | | | | | |
|---|---|---|---|---|---|---|---|---|---|---|---|---|---|---|---|---|---|---|
| | Top | 1 | 1 | 1 | 0 | 1 | 1 | 1 | 1 | Top | 3 | 3 | 3 | 0 | 4 | 4 | 4 | 4 |
| | Bottom | 0 | 0 | 1 | 0 | 1 | 1 | 1 | 1 | Bottom | 0 | 0 | 3 | 0 | 4 | 4 | 4 | 4 |
| | | | | | | scan fast | | | | | | | | | | | | |
| Case 2: | fg_mask | | | | | | | | | | | | | | | | | |
| | Top | 0 | 1 | 0 | 1 | 0 | 0 | 1 | 0 | | | | | | | | | |
| | Bottom | 1 | 1 | 1 | 1 | 1 | 1 | 1 | 1 | labels | | | | | | | | |
| | labels | | | | | | | | | Top | 0 | 3 | 0 | 3 | 0 | 0 | 3 | 0 |
| | Top | 0 | 4 | 0 | 5 | 0 | 0 | 3 | 0 | Bottom | 3 | 3 | 3 | 3 | 3 | 3 | 3 | 3 |
| | Bottom | 4 | x | x | x | x | x | x | x | | | | | | | | | |

72 ⟶

FIG. 7
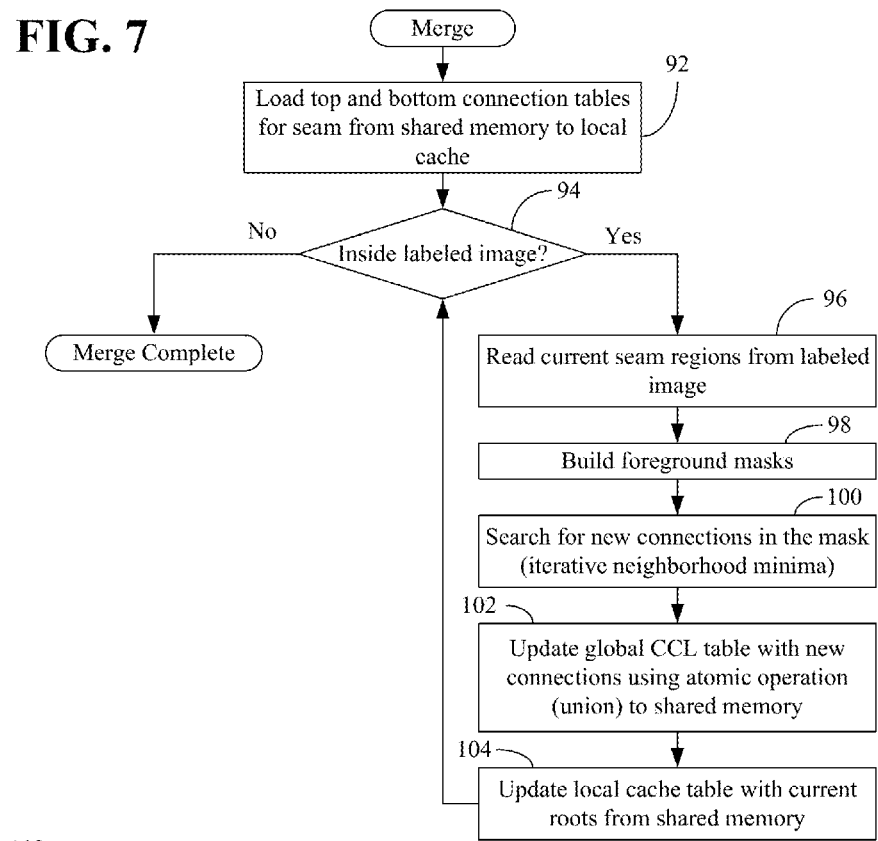
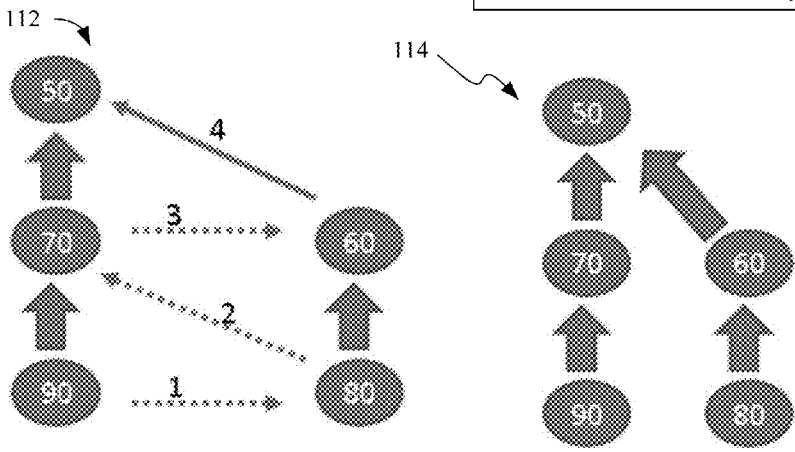
FIG. 8

CONNECTED COMPONENT LABELING IN GRAPHICS PROCESSORS

BACKGROUND

Computer vision applications may involve the automatic recognition of faces, gestures, and other objects in images and/or video. The recognition may be facilitated by connected component labeling (CCL), which identifies portions of an image/frame that belong to the same object. Traditionally, CCL solutions may have been implemented on a central processing unit (CPU), wherein the CPU-based solutions may have encountered inefficiency and power consumption challenges. While more recent CCL solutions may have used general purpose graphics processing unit (GPGPU) techniques to address some of these concerns, there remains considerable room for improvement.

BRIEF DESCRIPTION OF THE DRAWINGS

The various advantages of the embodiments will become apparent to one skilled in the art by reading the following specification and appended claims, and by referencing the following drawings, in which:

FIG. 7 is a flowchart of an example of a method of merging connection tables according to an embodiment;

FIG. 8 is an illustration of an example of a label union scenario according to an embodiment;

DETAILED DESCRIPTION

Figure 1:
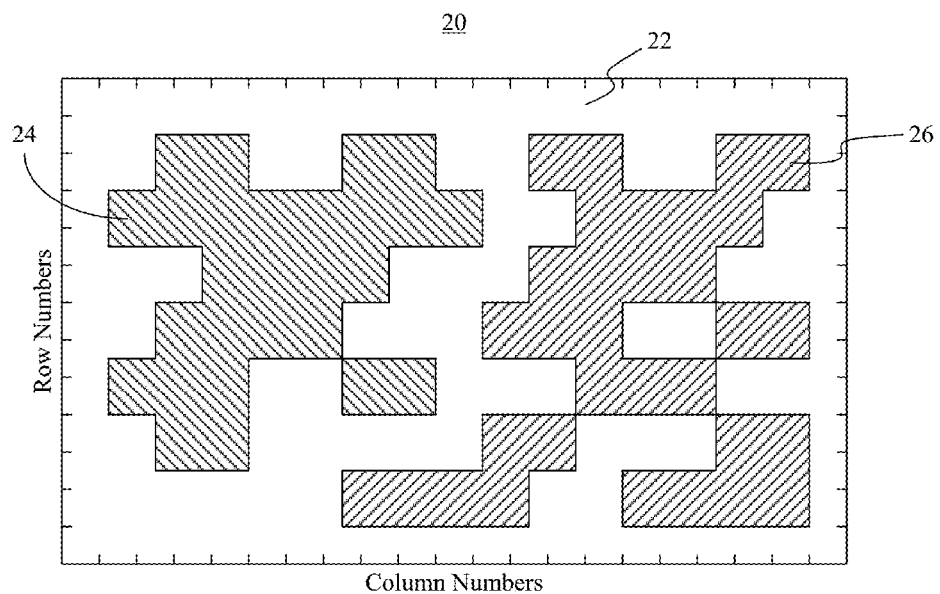
FIG. 1 is an illustration of an example of a connected component labeling (CCL) result according to an embodiment.

FIG. 1 shows a connected component labeling (CCL) result 20 in which an image is labeled as containing a background portion 22 as well as multiple other portions 24, 26 that correspond to different components (e.g., objects) in the image. For example, a first foreground portion 24 may correspond to one body part (e.g., a face) of an individual depicted in the image, whereas a second foreground portion 26 may correspond to another body part (e.g., a hand) of the individual depicted in the image. The labeled components may correspond to objects such as, for example, buildings, vehicles, landscape items (e.g., trees, hills, skylines), etc., or any combination thereof. As will be discussed in greater detail, the CCL result 20 may be generated entirely by a graphics processor using an approach that provides improved efficiency, less processing overhead, reduced power consumption, extended battery life, and so forth.

Figure 2:
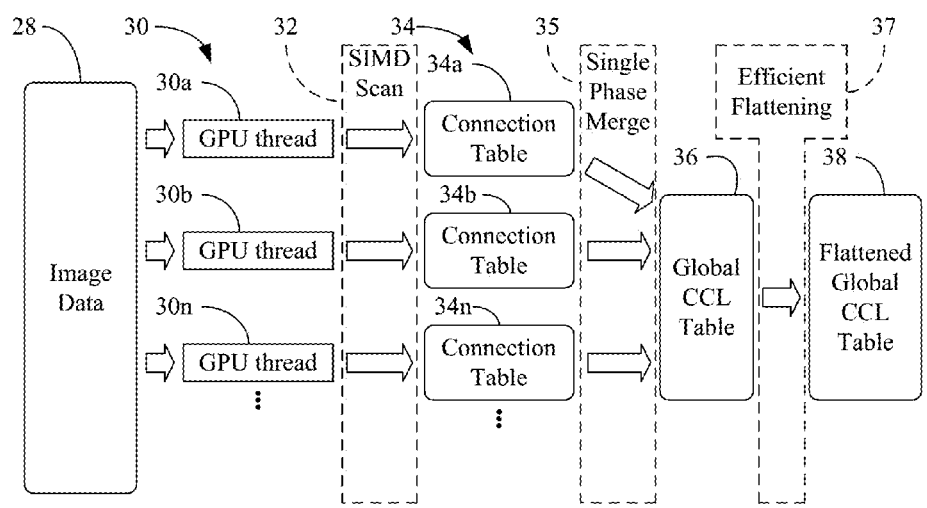
FIG. 2 is a block diagram of an example of a graphics processor CCL solution according to an embodiment.

Turning now to FIG. 2, a graphics processor CCL solution is shown in which data 28 (e.g., foreground data, partial label data) associated with an image is obtained. In the illustrated example, a plurality of threads 30 (30a-30n) in a graphics processor (e.g., graphics processing unit/GPU threads) are used to conduct a single instruction multiple data (SIMD) scan 32 of the data 28. In this regard, the graphics processor may include a relatively large number of execution units capable of providing substantial parallel operation for the CCL procedure. Moreover, the use of the SIMD scan 32 enables a single call to invoke multiple implementations of a function, wherein each implementation of the function may generate a connection table 34 (34a-34n) for a region/strip/patch of the image (e.g., 2×16 patch). The plurality of connection tables 34, which may correspond to the plurality of threads 30 (e.g., 1:1 correspondence with available threads), may be combined in a single phase merge procedure 35 to form a global CCL table 36. The use of the single phase merge procedure 35 in conjunction with the plurality of threads 30 may further improve efficiency by harnessing all available threads in the graphics processor.

The global CCL table 36 may generally contain a numerical label for each pixel of the image, wherein the labels may have a hierarchical data structure. For example, the pixel labels of a particular portion such as the first foreground portion 24 (FIG. 1) might all be linked to a "root" label assigned to one or more of the pixels in the portion, wherein another portion such as the second foreground portion 26 (FIG. 1) may all be linked to a different root label assigned to one or more of the pixels in that portion. Additionally, the global CCL table 36 may be converted to a flattened global CCL table 38 (FIG. 2) having global incremental labels (e.g., consecutive labeling among root labels) via a highly efficient flattening procedure 37. The global incremental labels of the flattened global CCL table 38 may enable subsequent computer vision processing to be more efficient.

Figure 3:
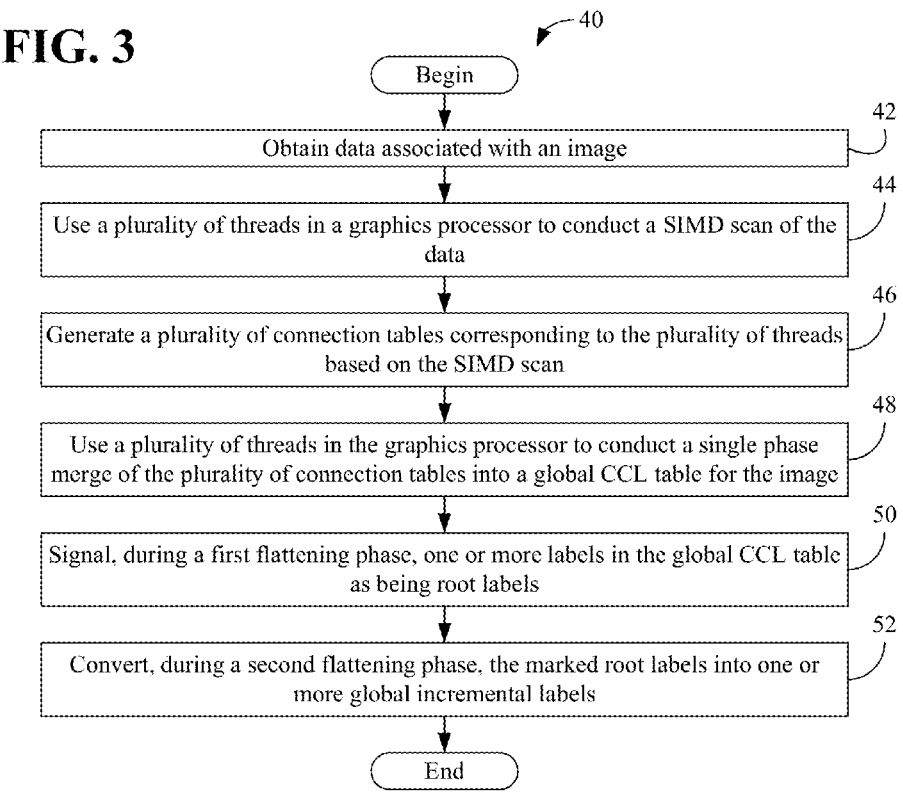
FIG. 3 is a flowchart of an example of a method of labeling connected components according to an embodiment.

FIG. 3 shows a method 40 of labeling connected components. The method 40 may be implemented as a set of logic instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, the method 40 may be implemented using any of the herein mentioned circuit technologies.

Illustrated processing block 42 provides for obtaining data associated with an image, wherein the data may include, for example, foreground data (e.g., map/mask indicating whether each pixel is a foreground pixel or background pixel), partial label data (e.g., component labels for the topmost row and leftmost column of a region/patch only), etc., or any combination thereof. The data may be obtained from, for example, an earlier stage in a computer vision pipeline. A plurality of threads in a graphics processor may be used at block 44 to conduct a SIMD scan of the data.

SIMD Scan

Figure 4A:
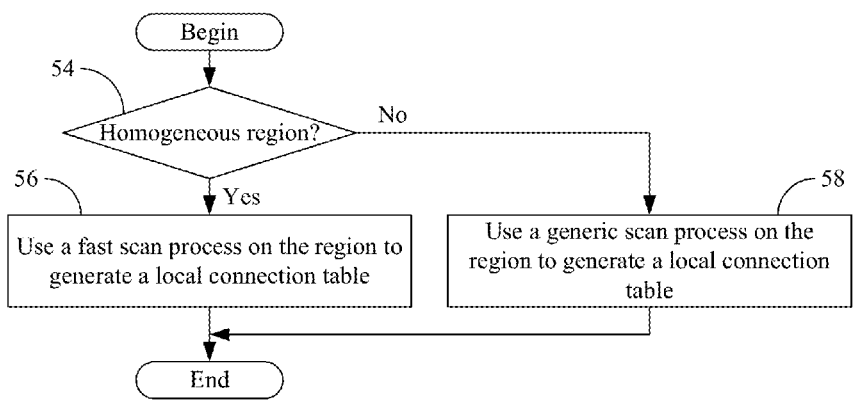
FIGS. 4A-4C are flowcharts of examples of methods of conducting single instruction multiple data (SIMD) scans according to embodiments.

FIG. 4A demonstrates that a determination may be made at block 54 as to whether the region being operated on is homogeneous (e.g., whether a homogeneous condition exists). As already noted, each GPU thread may operate on a subset of the image such as a 2×16 patch containing a top row and a bottom row of pixels. If the region is homogeneous, a fast scan process may be used at block 56 on the region to generate a local connection table for the region. Otherwise, illustrated block 58 uses a generic scan process on the region to generate the local connection table.

Figure 4B:
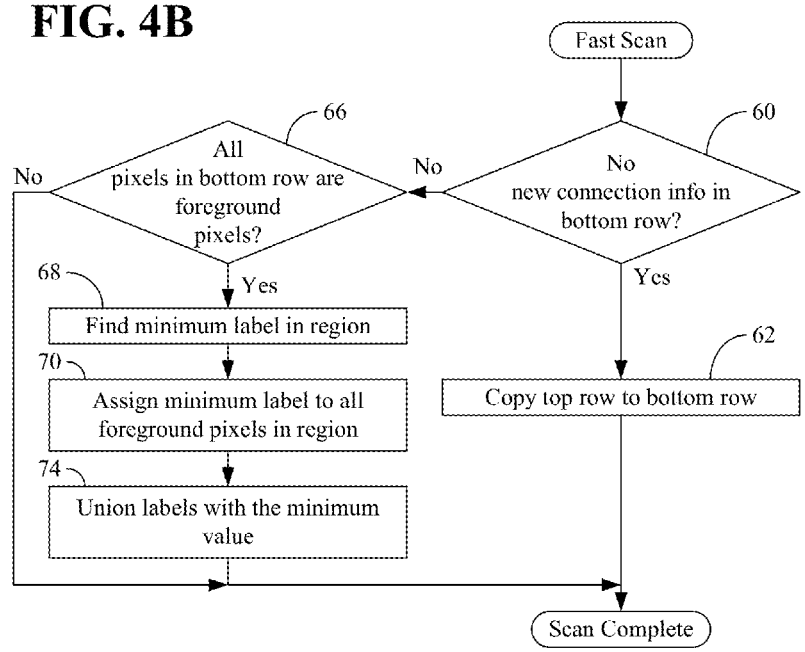
Figures 5, 6:
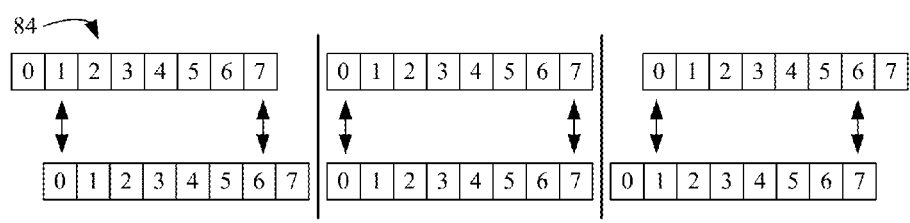
FIG. 5 is an illustration of an example of a fast scan scenario according to an embodiment.
FIG. 6 is an illustration of an example of a generic scan scenario according to an embodiment.

FIGS. 4B and 5 demonstrate that a fast scan process may involve determining at block 60, for a region having a top row and a bottom row, whether any new connection information has been identified in the bottom row. New connection information may be considered information that identifies a new component and/or a new relationship between the pixels of a component. More particularly, if it is determined that the foreground mask (e.g., designating foreground pixels with a "1" and background pixels with a "0") for the bottom row is substantially similar to the foreground mask for the top row, it may be inferred that no new connection information has been identified in the bottom row. In such a case, block 62 may copy the labels from the top row into the bottom row. For example, as best shown in the "Case 1" scenario 64 of FIG. 5, the labels "3, 0, 4, 4, 4, 4" may be copied from the top row to the bottom row because the corresponding foreground data contains no new connection information (e.g., is substantially similar).

If, on the other hand, new connection information is present in the bottom row, a determination may be made at block 66 as to whether all pixels in the bottom row are foreground pixels (i.e., designated with a "1" in the foreground mask). If so, illustrated block 68 finds the minimum label in the region/patch, wherein the minimum value may be assigned at block 70 to all foreground pixels in the region/patch. In this regard, a hierarchical data structure may be used in which the lowest label linked to a pixel is considered a "root" label for the pixel in question.

Thus, in the "Case 2" scenario 72 of FIG. 5, the label "3" might be identified as the minimum label in the region and assigned to all of the foreground pixels (i.e., the pixels designated with a "1" in a foreground mask). Block 74 may form a union (e.g., association/link) between the labels of the region and the root label. The illustrated approach may therefore be a relatively fast approach to assigning labels to the pixels of an image. If it is determined at illustrated block 66 that all pixels in the bottom row are not foreground pixels, the region may be deemed as non-homogenous and the scan process may terminate without successfully labeling all pixels in the region.

The annotated code snippet below shows one approach to implementing a fast scan process.

```
//input:
//labels: 2x16 patch, with first row and first column previously labeled.
//fg_mask 2x16 forground mask, reverse of bg_mask
//returns: true, if input label succesfuly labeled, false otherwise
scan_fast(matrix<2, 16>& labels, fg_mask, bg_mask)
{
    //case 1: there is no new connection information in row 1
    // copy/merge top row into bottom row
    vector<16> same_info;
    same_info = _bg_mask.row(1) | ~(fg_mask.row(0));
    if(same_info.all( ) )
    {
        labels.row(1).merge(labels.row(0), BG_LBL, fg_mask.row(1));
        return true;
    }
    //case 2: , all pixels in bottom row are foreground pixels -->
    // all forground pixels in 2x16 patch will assume
    //minimum label found in patch
    if(fg_mask.row(1).all( ))
    {
        //find min label from existing labeled values
        int min = reduced_min(labels.row(1));
        min = reduced_min(min, labels(1,0);
        labels.merge(min, BG_LBL, fg_mask);
        //perform union
        Union(labels.row(0), min);
        Union(labels(1,0), min)
        return true;
    }
    // patch was not identified for fast scan method
    return false;
```

Figure 4C:
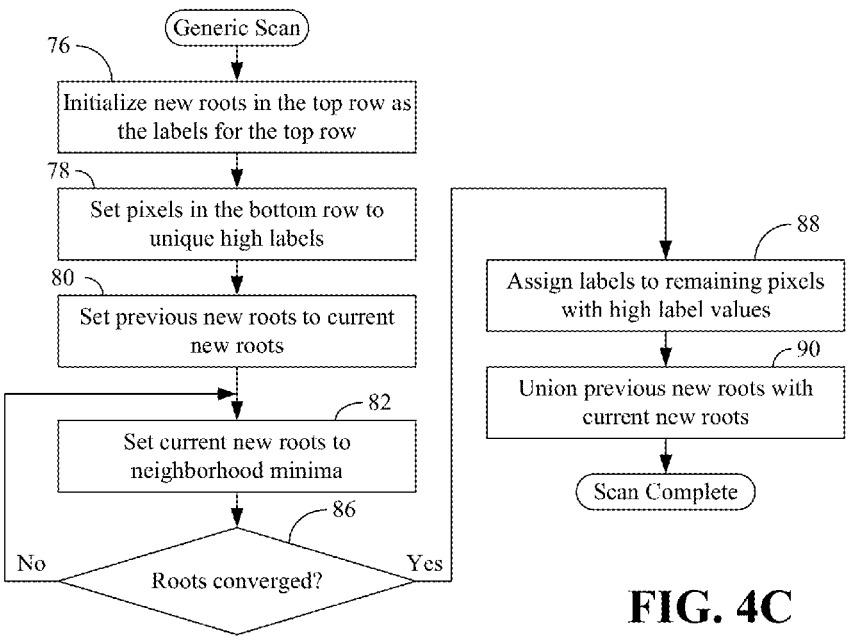

As already noted, if the region is not homogeneous, a generic scan process may be used on the region to generate the local connection table. FIGS. 4C and 6 demonstrate one approach in which an iterative neighborhood search is used, wherein the search ends when no new minima are found. More particularly, block 76 may provide for initializing new roots in the top row as the labels for the top row, wherein pixels in the bottom row may be set at block 78 to unique high labels (e.g., 0xffffff00, 0xffffff01, . . . , 0xffffff0f). Illustrated block 80 sets the previous new roots to the current new roots, and the current new roots are set to the neighborhood minima at illustrated block 82. As shown in the neighborhood minima scenario 84 of FIG. 6, each row may be compared with a copy of itself (e.g., shifted right, no shift, shifted left) to find the minimum label value in the neighborhood.

A determination may be made at block 86 as to whether the roots have converged (e.g., new roots stop changing). If not, the neighborhood minima search may be repeated at block 82. Otherwise, illustrated block 88 assigns valid labels to remaining pixels with high label values assigned at block 78, wherein a union may be formed between the previous new roots and the current new roots at block 90.

The annotated code snippet below shows one approach to implementing a generic scan process.

```
//inputs:
//labels :a partially labeled patch, with roots.
// fg_mask: foreground pixels mask:
// 0 - background pixel,
// 1 - foreground pixel
scan_generic(matrix<2, 16>& labels, fg_mask)
{
    //new_roots will receive update root values at end of this routine
    matrix<2,16> new_roots.row(0) = labels.row(0);
    //initialize non labeld pixels (row(1)[1-7]), with very high unique label values:
    //e.g. g_new_labels= {0xffffff00,0xffffff01,...,0xffffff0f},
    //bg pixels receives max value label
    new_roots.row(1) = merge(g_new_labels, 0xffffffff ,
    fg_mask.row(1));
    vector< 16> not_done;
    do {
        matrix<2,16> new_roots_prev = new_roots;
        calc_nigborhood_min(new_roots, fg_mask);
```

```
            //convergence critera:
            not_done = new_roots != new_roots_prev;
        }while( not_done.any( ));
        //Remaining pixels with initial high label, have no labeled neighbors
        //and will be relabeled with valid labels
        assignNewLabels(new_roots.row(1));
        //update connection table, set labels with new_roots
        Union(new_roots, labels);
}
```

In addition, to prevent incorrect propagation of minimum labels through background pixels (e.g., with maximum label values), background pixels may be reset after every minimum calculation. The annotated code snippet below shows one approach to resetting background pixels.

```
calcmin_single(matrix<2,16> labels, offset_labels, fg_mask)
{
    labels = pointwise_min(labels, offset_labels);
    //rest bg pixels to max value to prevent min propagation
    //over bg pixels
    labels.merge(labels, 0xffffffff, fg_mask);
}
```

Single Phase Merge

Returning now to FIG. 3, a plurality of connection tables corresponding to the plurality of threads conducting the SIMD scan may be generated at block 46 based on the SIMD scan. The connection tables may therefore contain labels for each of the pixels in the image, wherein pixels linked to the same root label in the hierarchy may be considered representative of the same component in the image. Moreover, illustrated block 48 provides for using a plurality of threads in the graphics processor to conduct a single phase merge of the plurality of connection tables into a global CCL table for the image.

For example, FIG. 7 demonstrates that each thread may be responsible for merging two neighboring connection tables from the SIMD scan and updating the results to shared memory (e.g., host memory, system memory). Once all threads complete their respective merge operations, the result may be a single global CCL table such as, for example, the global CCL table 36 (FIG. 2), for the entire image. More particularly, top and bottom connection tables for a "seam" may be loaded from shared memory to a local cache at block 92. A seam may be considered the horizontal border between adjacent patches/regions in the image. Illustrated block 94 determines whether both connection tables are located inside the image being labeled. If not, the merge process may terminate.

Otherwise, block 96 may read the current seam regions (e.g., seam block) from the labeled image, wherein foreground masks may be built for the regions at block 98. Additionally, a search may be conducted at block 100 for new connections in the foreground mask using an iterative neighborhood minima approach. Block 100 may therefore be similar to the functionality described with regard to the neighborhood minima scenario 84 (FIG. 6), already discussed. Illustrated block 102 provides for updating the global CCL table in shared memory with new connections from block 100 using one or more atomic operations, wherein the local cache table may be updated at block 104 with current root labels from shared memory.

The annotated code snippet below shows one approach to conducting a single phase merge.

```
merge(bottom_seam, top_seam)
{
    //load connection table from host memory to local cache
    vector<256> CachedTableTop =
        ReadTableFromSharedMem(top_seam);
    vector<256> CachedTableBottom =
        ReadTableFromSharedMem(bottom_seam:
    //walk through the seam row in the labeled image
    for(int block = 0; block < surf_width; block +=16)
    {
        matrix<2, 16> labels, roots;
        //read seam block from labeled image
        ReadBlock(block, top_row, labels);
        vector<16> fg_mask = labels != BACKGROUND_LABEL
        //iterative procedure to find neighborhood minima
        //similar to scan_generic, depicted earlier
        CalcMinRoots(labels, roots, fg_mask);
        //perform atomic union operation to shared memory
        vector<16> GlobalRoots = UnionToSharedMem(labels, roots);
        //update local cached tables with current roots from shared memory
        UnionToCachedTables(labels, GlobalRoots);
    }
}
```

Figure 9:
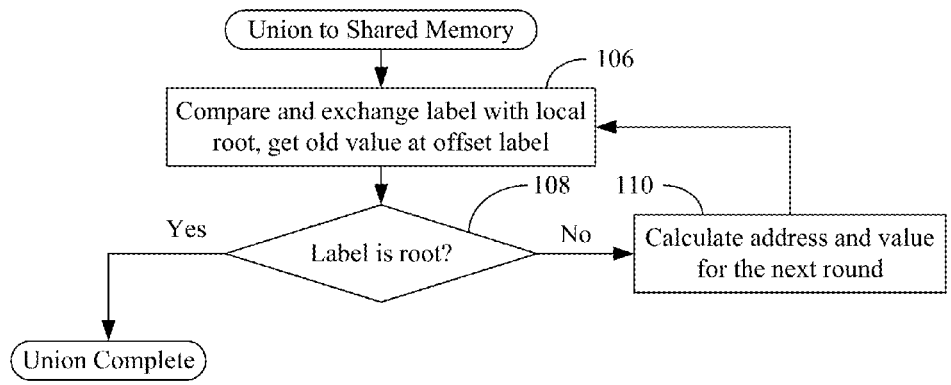
FIG. 9 is a flowchart of an example of a method of conducting a global CCL table union to shared memory according to an embodiment.

With continuing reference to FIGS. 8 and 9, one approach to updating a global table in shared memory is shown. For example, illustrated block 106 compares and exchanges each label with its local root and obtains the old value at the offset label. Thus, block 106 may be implemented by underlying hardware, which conditionally exchanges new root labels. Accordingly, block 108 may determine whether the underlying hardware has exchanged labels, based on the returned value. If it is determined at block 108 that the current value of the label matches the old value, then the compare and exchange atomic operation has set the new root label and the union to shared memory process may terminate. Otherwise, illustrated block 110 calculates an address and label value to set in the next round, and block 106 may be repeated.

For example, FIG. 8 demonstrates that a pre-union hierarchy scenario 112 may involve several pixels having labels (e.g., labels "60", "70", "80", "90") that are linked to a root label (e.g., label "50"). The dotted arrows may represent atomic operation attempts (e.g., attempts "1" through "3" in that order) that do not modify the global CCL table in shared memory, as the labels are not root labels. The final successful attempt (e.g., attempt "4"), however, may finally unify the two corresponding label trees, as shown in the post-union hierarchy scenario 114. The annotated code snippet below shows one approach to using atomic operations to update a global CCL table in shared memory.

```
int UnionToSharedMem(int label, localRoot)
{
    int RootInSharedMem;
    bool not_done = true;
    while(not_done)
    {
        //CompareExchange: sets address: label with localRoot,
        //if current value is label (thus label is a root)
        //it returns the old value at offset label
        RootInSharedMem = CompareExchange(label, label, localRoot)
        not_done = label != RootInSharedMem;
        //prepare the address and value to set in next round
        label = max(localRoot, RootInSharedMem);
        localRoot = min(localRoot, RootInSharedMem);
    }
    return localRoot
}
```

Efficient Flattening

Returning now to FIG. 3, illustrated block 50 signals, during a first flattening phase, one or more labels in the global CCL table as being root labels, wherein the marked root labels may be converted, during a second flattening phase, into one or more global incremental labels at block 52.

Figure 10:
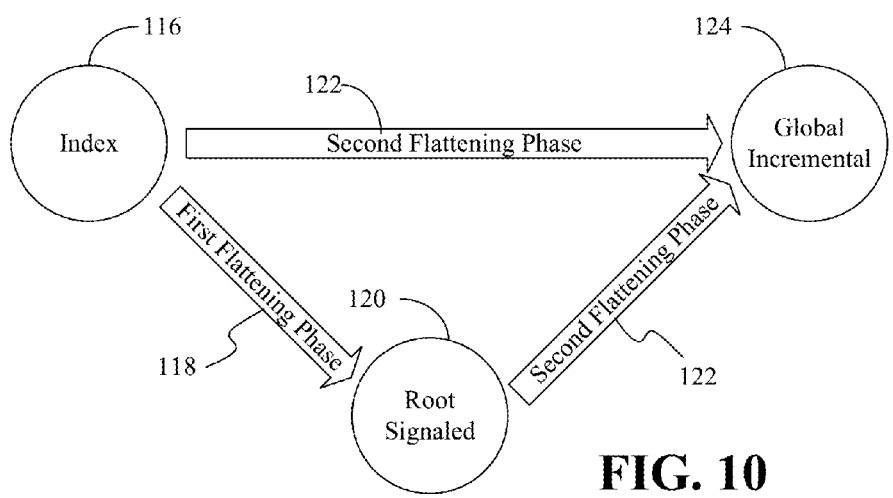
FIG. 10 is state diagram of an example of a table flattening process according to an embodiment.

For example, the state diagram of FIG. 10 demonstrates that the labels of the global CCL table may exit the single phase merge procedure in an index state 116. Root labels may undergo a first flattening phase 118 that transitions them into a root signaled state 120, whereas the root signaled labels and the non-root labels may undergo a second flattening phase 122 that transitions them into a global incremental state 124 (e.g., consecutively labeled at the root level).

Figure 11A:
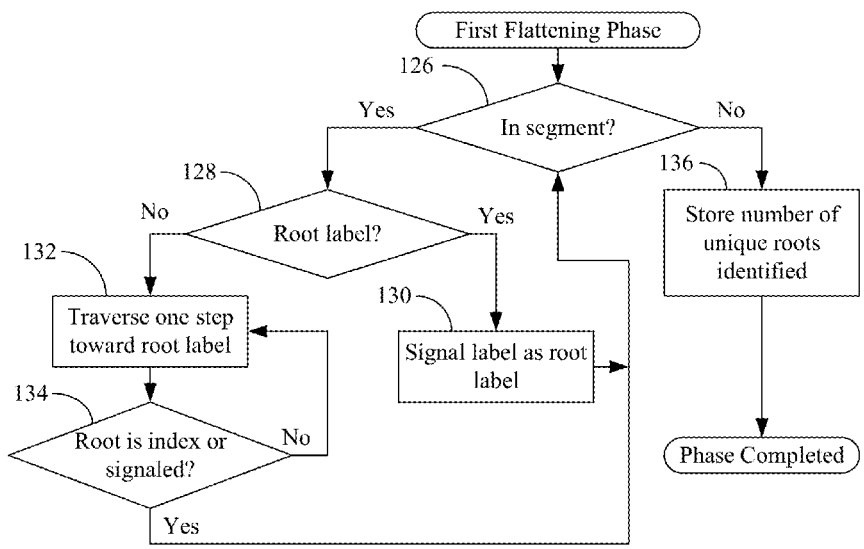
FIGS. 11A and 11B are flowcharts of examples of table flattening phases according to embodiments.

FIG. 11A demonstrates that the first flattening phase may involve determining at block 126 whether the label being processed is in the current segment, wherein a segment may be considered a contiguous portion of the connection table that is processed by a single thread (e.g., if 100 threads are available, then thread #1 may handle table segment entries 0-127, thread #2 may handle table segment entries 128-255, and so forth). If so, a determination may be made at block 128 as to whether the label is a root label. If the label is a root label, illustrated block 130 signals the label as a root label (e.g., by assigning a unique and relatively high offset value to the label), wherein the determination at block 126 may repeat. If, on the other hand, the label is not a root label, block 132 may traverse one step toward the root label in the labeling hierarchy. A determination may be made at block 134 as to whether the label is either in the index state or has been signaled as being a root label. If not, the traversal may be repeated at block 132. Otherwise, the determination at block 126 may be repeated. If it is determined at block 126 that the root being processed is not in the current segment, illustrated block 136 stores the number of unique root labels identified and the first flattening phase may terminate. The number of unique roots identified may be useful in the second flattening phase, discussed in greater detail below. The code snippet below shows one approach to implementing the first flattening phase.

```
//pre-condition: single connection table
//post-condition: table is flattened; root labels represented as "root signaled"
// non-root labels point to root labels, due to concurrency, those are
//represented as being in either the "index" or "root signaled" state
int flattenL_Phase1(int * tbl, int segment_offset, int segment_size, int
thread_id, int * local_k_container)
{
    int local_k = 1;
    int thread_offset = (thread_id + 1) << 24; //large shift operation
    for(int i = segment_offset; i < segment_offset + segment_size; i++)
    {
        //case 1: tbl[i] is a root label: we assign a local incremental value
        k,
        //then signal it as a "root signaled" by adding the thread_offset
        //into the HighByte
        if(tbl[i] == i)
        {
            tb[i] = local_k + thread_offset;
            local_k++;
        }
        //case 2: tbl[i] is not root label, iteratively find its root label,
        //due to concurrency of threads, flattening the table, the stop
        //condition is finding a root either in "index" state (tbl[i] == i)
        else
        {
            int prev;
            do {
                prev = tbl[i]
                tbl[i] = tlb[prev];
            }while(tbl[i] > prev || tbl[i] >= (1 << 24);
        }
    }
    //finally store the number of unique root identified by the thread in the
    //following:
    local_k_container[thread_id] = local_k;
}
```

Figure 11B:
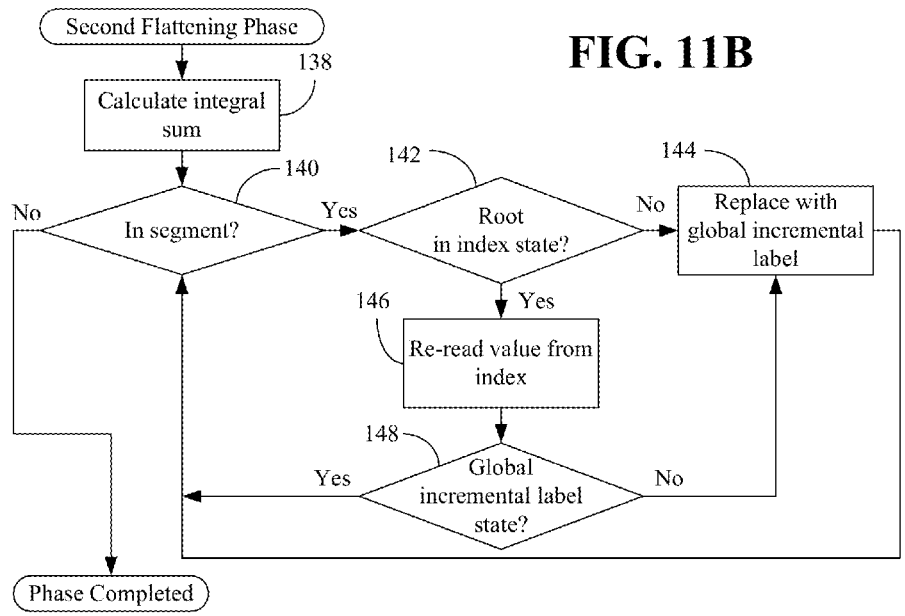

FIG. 11B demonstrates that the second flattening phase may involve calculating an integral sum at block 138 based on the number of unique roots identified in the first flattening phase, wherein a determination may be made at block 140 as to whether the label being processed is in the current segment. If so, a determination may be made at block 142 as to whether the label is in the index state. If not, illustrated block 144 replaces the label with a global incremental label and the determination at block 140 may be repeated. Otherwise, the value of the label is re-read at block 146 from the index, wherein the re-read value should be either a root signaled label or a global incremental label. If it is determined at block 148 that the label is in the global incremental state, the determination at block 140 may be repeated. Otherwise, block 144 may replace the label with a global incremental label. If it is determined at block 140 that the label being processed is not in the current segment, the illustrated flattening phase may terminate. The code snippet below shows one approach to implementing the second flattening phase.

```
//pre-condition: phase 1 completed
//post-condition: globally unique incremental labels assigned to the entire
//table
int flattenL_Phase2(int * tbl, int segment_offset, int segment_size, int
thread_id, int *local_k_container)
{
    //integral sum definition: p[i] = p[0] + p[1] + ... p[i+1]
    int localSums[MAX_THREADS] =
    calcIntegralSum(local_k_container);
    int thread_start_value = localSums[thread_id];
    for(int i = segment_offset;i < segment_offset + segment_size; i++)
    {
        //case 1: root in tbl[i] is in "index" state, re-read its value from
        //index, it should now be either in "root signaled" or "global
        //incremental" state
        if(tbl[i] < (1 << 24))
        {
            tbl[i] = tbl[tbl[i]];
            if(tbl[i] < (1 << 24)) //global incremental label state done
                //continue to next pixel
                continue;
        }
        //fall through to case 2: tbl[i] is a root in "root signaled" form,
        //replace it with a global incremental label
        {
            int root_thread = (tbl[i] >> 24) −1;
            int local_root_count = tbl[i] & ((1 << 24) −1);
            tbl[i] = local_root_count + localSums[root_thread];
        }
    }
}
```

Figure 12:
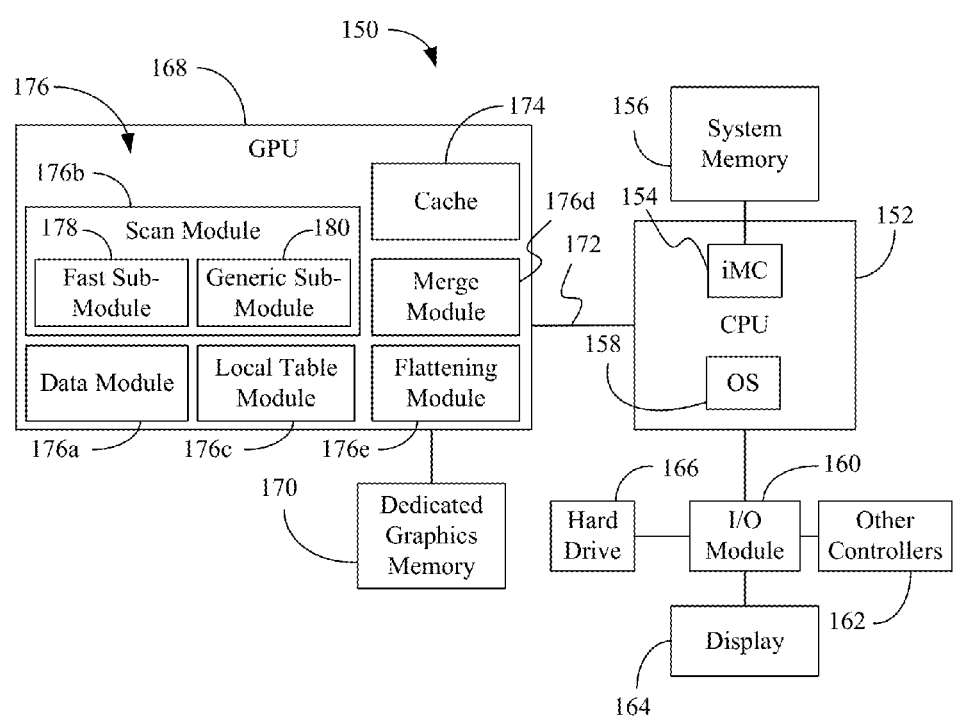
FIGS. 12 and 13 are block diagrams of examples of systems according to embodiments.

Turning now to FIG. 12, a computing system 150 is shown, wherein the system 150 may be part of a mobile platform such as a laptop, wearable computer, mobile Internet device (MID), personal digital assistant (PDA), media player, imaging device, etc., any smart device such as a smart phone, tablet computer, smart TV (television) and so forth, or any combination thereof. The system 150 may also be part of a fixed platform such as a personal computer (PC), server, workstation, etc. The illustrated system 150 includes a central processing unit (CPU, e.g., host processor) 152 with an integrated memory controller (iMC) 154 that provides access to system memory 156, which may include, for example, double data rate (DDR) synchronous dynamic random access memory (SDRAM, e.g., DDR3 SDRAM JEDEC Standard JESD79-3C, April 2008) modules. The modules of the system memory 156 may be incorporated, for example, into a single inline memory module (SIMM), dual inline memory module (DIMM), small outline DIMM (SODIMM), and so on.

The CPU 152 may also have one or processor cores (not shown), where each core may be fully functional with instruction fetch units, instruction decoders, level one (L1) cache, execution units, and so on. The CPU 152 may alternatively communicate with an off-chip variation of the iMC 154, also known as a Northbridge, via a front side bus or a point-to-point fabric that interconnects each of the components in the system 150. The CPU 152 may also execute an operating system (OS) 158.

The illustrated CPU 152 communicates with an input/output (IO) module 160, also known as a Southbridge, via a bus. The iMC 154/CPU 152 and the IO module 160 are sometimes referred to as a chipset. The CPU 152 may also be operatively connected to a network (not shown) via a network port through the IO module 160 and various other controllers 162. Thus, the other controllers 162 may provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 160 may also communicate with a display 164 to provide for the visual output of video, images, and so forth. The other controllers 162 may also communicate with the IO module 160 to provide support for user interface devices (not shown) such as a keypad, mouse, etc., in order to allow a user to interact with and perceive information from the system 150.

The IO module 160 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IOmodule 160 is also coupled to storage, which may include a hard drive 166, solid state disk/SSD, read only memory (ROM), optical disk, flash memory (not shown), etc.

The illustrated system 150 also includes a dedicated graphics processing unit (GPU, e.g., graphics processor) 168 coupled to a dedicated graphics memory 170. The dedicated graphics memory 170 may include, for example, GDDR (graphics DDR) or DDR SDRAM modules, or any other memory technology suitable for supporting graphics rendering. The GPU 168 and graphics memory 170 might be installed on a graphics/video card, wherein the GPU 168 may communicate with the CPU 152 via a graphics bus 172 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 152 die, configured as a discrete card on the motherboard, etc. The GPU 168 may also include an internal cache 174 to store instructions and other data.

The illustrated GPU 168 includes logic 176 (176a-176e) that is configured to label connected components in images. The workloads of the logic 176 may generally be distributed across a plurality of execution units (not shown) that provide a high level of parallelism. In the illustrated example, a data module 176a is configured to obtain data associated with an image, wherein the data may include foreground data, partial label data, etc., or any combination thereof. A scan module 176b may use a plurality of threads in the GPU 168 to conduct a SIMD scan of the data and a local table module 176c may generate a plurality of connection tables corresponding to the plurality of threads based on the SIMD scan.

Moreover, the scan module 176b may include a fast sub-module 178 to, for each of the plurality of threads, use a first scan process on a region of the image if a homogeneous condition is detected with respect to the region of the image. Additionally, a generic sub-module 180 may, for each of the plurality of threads, use a second scan process on the region if the image of the homogeneous condition is not detected with respect to the region of the image. In one example, the first scan process is faster than the second scan process.

The logic 176 may also include a merge module 176d to use a plurality of threads in the graphics processor to conduct a single phase merge of the plurality of connection tables into a global CCL table for the image. The merge module 176d may use one or more atomic operations to update the global CCL table in a shared memory such as, for example, the dedicated graphics memory 170 or the system memory 156. Additionally, a flattening module 176e may signal, during a first flattening phase, one or more labels in the global CCL as being root labels and convert, during a second flattening phase, the marked root labels into one or more global incremental labels. Of particular note is that the illustrated logic 176 may generate global CCL tables without the involvement of the CPU 152. As a result, the processing overhead associated with computational transitions between the GPU 168 and the CPU 152 may be obviated with regard to connected component labeling.

Figure 13:
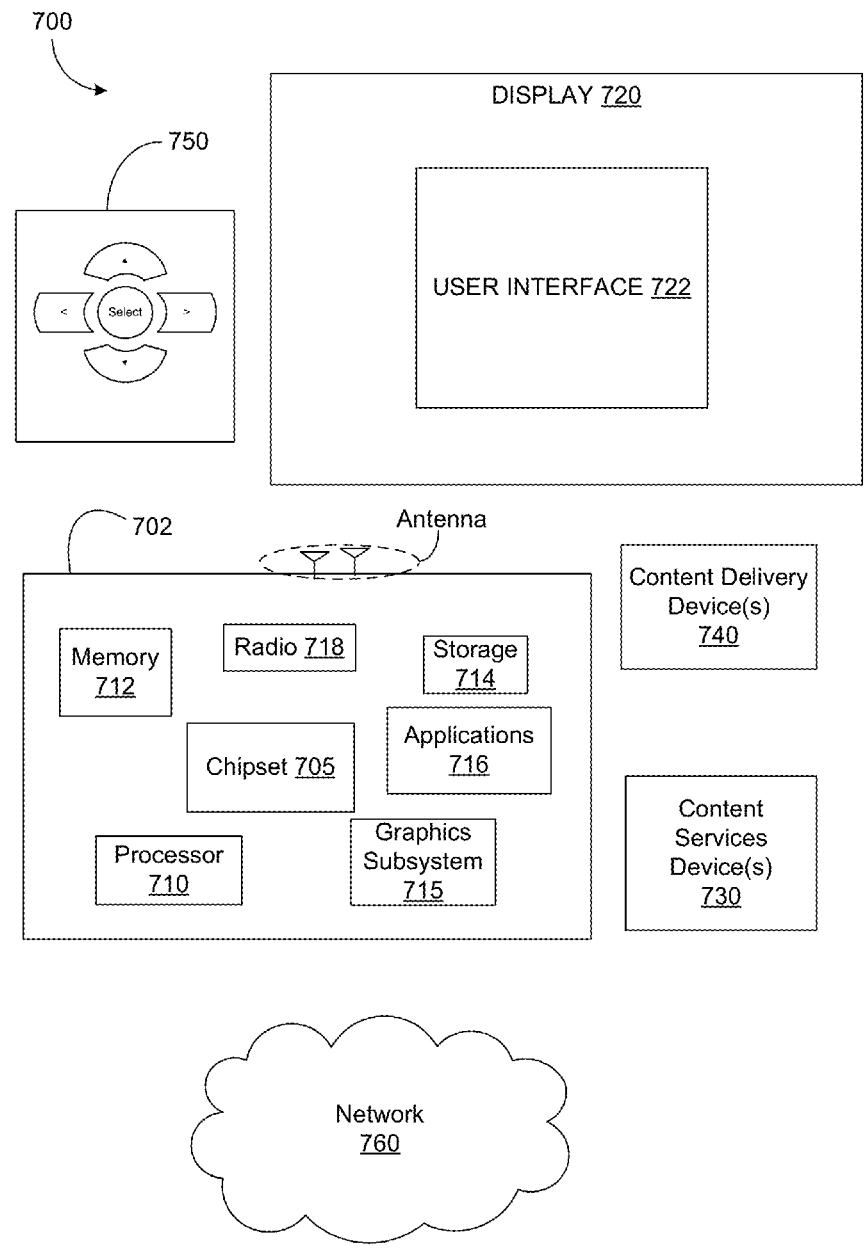

FIG. 13 illustrates an embodiment of a system 700 that may label connected components in images according to an embodiment. In embodiments, the system 700 may be a media system although system 700 is not limited to this context. For example, system 700 may be incorporated into a personal computer (PC), laptop computer, ultra-laptop computer, tablet computer, touch pad, portable computer, handheld computer, palmtop computer, personal digital assistant (PDA), cellular telephone, combination cellular telephone/PDA, television, smart device (e.g., smart phone or smart television), mobile internet device (MID), messaging device, data communication device, gaming console, and so on.

In embodiments, the system 700 comprises a platform 702 coupled to a display 720. The platform 702 may receive content from a content device such as content services device(s) 730 or content delivery device(s) 740 or other similar content sources. A navigation controller 750 comprising one or more navigation features may be used to interact with, for example, the platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718. The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. The graphics subsystem 715 could be integrated into the processor 710 or chipset 705. The graphics subsystem 715 could be a stand-alone card communicatively coupled to chipset 705. In one example, the graphics subsystem 715 functions similarly to the GPU 168 (FIG. 12) and the processor 710 functions similarly to the CPU 152 (FIG. 12), both already discussed. Accordingly, the graphics subsystem 715 may be configured to label connected components in images without the involvement of the processor 710.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display a user interface 722 on the display 720.

In embodiments, the content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to platform 702 and/or to display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and the platform 702 and/display 720, via the network 760 or directly. It will be appreciated that the content may be communicated unidirectionally and/or bidirectionally to and from any one of the components in the system 700 and a content provider via the network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from the navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display such as, for example, the display 720, by movements of a pointer, cursor, focus ring, or other visual indicators displayed on the display. For example, under the control of the software applications 716, the navigation features located on the navigation controller 750 may be mapped to virtual navigation features displayed on the user interface 722, for example. In embodiments, the controller 750 may not be a separate component but integrated into the platform 702 and/or display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, the chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and content services device(s) 730 may be integrated, or the platform 702 and content delivery device(s) 740 may be integrated, or the platform 702, content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, the system 700 may be implemented as a wireless system, a wired system, or a combination of both. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
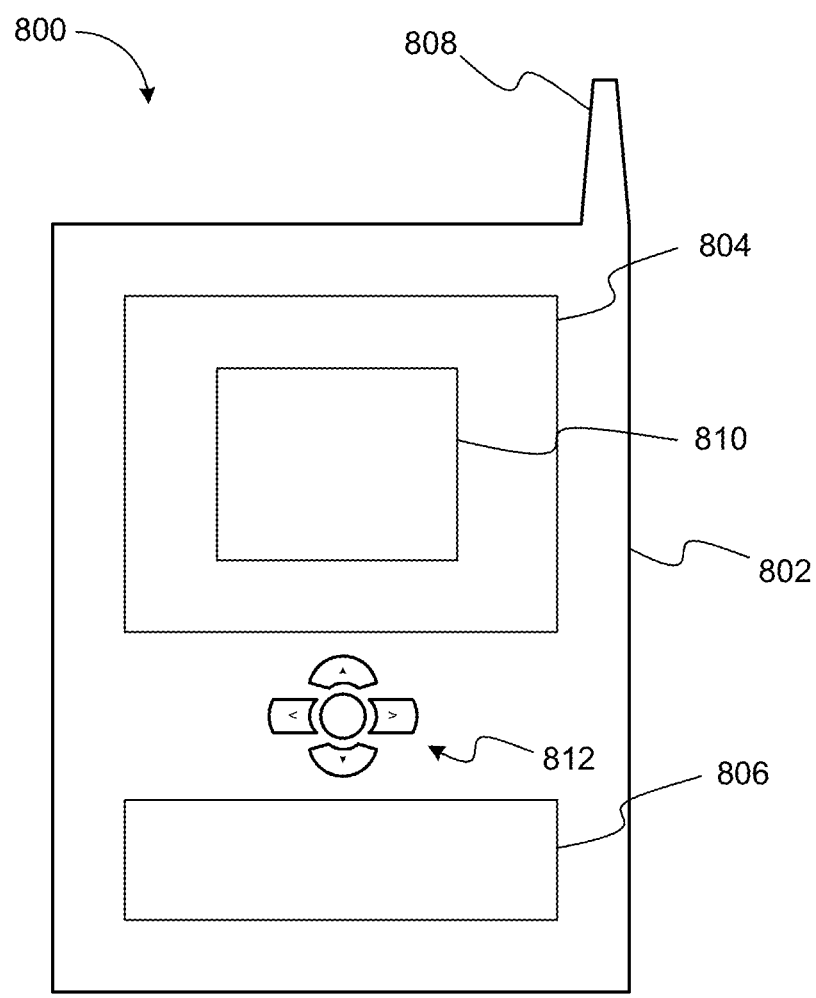
FIG. 14 is a block diagram of an example of a system having a small form factor according to an embodiment.

As described above, the system 700 may be embodied in varying physical styles or form factors. FIG. 14 illustrates embodiments of a small form factor device 800 in which the system 700 (FIG. 13) may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of a microphone. Such information may be digitized by a voice recognition device. The embodiments are not limited in this context.

Additional Notes and Examples

Example 1 may include a system to label connected components, comprising a display to present an image and a graphics processor including a scan module to use a plurality of threads in the graphics processor to conduct a single instruction multiple data (SIMD) scan of data associated with an image, a local table module to generate a plurality of connection tables corresponding to the plurality of threads based on the SIMD scan, and a merge module to use a plurality of threads in the graphics processor to conduct a single phase merge of the plurality of connection tables into a global connected components labeling (CCL) table for the image.

Example 2 may include the system of Example 1, wherein the scan module includes a fast sub-module to, for each of the plurality of threads, use a first scan process on a region of the image if a homogeneous condition is detected with respect to the region of the image, and a generic sub-module to, for each of the plurality of threads, use a second scan process on the region of the image if the homogeneous condition is not detected with respect to the region of the image, wherein the first scan process is faster than the second scan process.

Example 3 may include the system of Example 1, wherein the merge module is to use one or more atomic operations to update the global CCL table in a shared memory with one or more new connections between components of the image.

Example 4 may include the system of Example 1, wherein the graphics processor further includes a flattening module to signal, during a first flattening phase, one or more labels in the global CCL table as being root labels, and convert, during a second flattening phase, the marked root labels into one or more global incremental labels.

Example 5 may include the system of any one of Examples 1 to 4, further including a data module to obtain the data associated with the image.

Example 6 may include the system of Example 5, wherein the data is to include foreground data and partial label data.

Example 7 may include a method of labeling connected components, comprising using a plurality of threads in a processor to conduct a single instruction multiple data (SIMD) scan of data associated with an image, generating a plurality of connection tables corresponding to the plurality of threads based on the SIMD scan, and using a plurality of threads in the processor to conduct a single phase merge of the plurality of connection tables into a global connected components labeling (CCL) table for the image.

Example 8 may include the method of Example 7, wherein, for each of the plurality of threads, the SIMD scan of the data includes using a first scan process on a region of the image if a homogeneous condition is detected with respect to the region of the image, and using a second scan process on the region of the image if the homogeneous condition is not detected with respect to the region of the image, wherein the first scan process is faster than the second scan process.

Example 9 may include the method of Example 7, wherein the single phase merge includes using one or more atomic operations to update the global CCL table in shared memory with one or more new connections between components of the image.

Example 10 may include the method of Example 7, further including signaling, during a first flattening phase, one or more labels in the global CCL table as being root labels, and converting, during a second flattening phase, the marked root labels into global incremental labels.

Example 11 may include the method of any one of Examples 7 to 10, further including obtaining the data associated with the image.

Example 12 may include the method of Example 11, wherein the data includes foreground data and partial label data.

Example 13 may include at least one computer readable storage medium comprising a set of instructions which, when executed by a computing device, cause the computing device to use a plurality of threads in a processor to conduct a single instruction multiple data (SIMD) scan of the data, generate a plurality of connection tables corresponding to the plurality of threads based on the SIMD scan, and use a plurality of threads in the processor to conduct a single phase merge of the plurality of connection tables into a global connected components labeling (CCL) table for the image.

Example 14 may include the at least one computer readable storage medium of Example 13, wherein, when executed, the instructions, for each of the plurality of threads, cause a computing device to use a first scan process on a region of the image if a homogeneous condition is detected with respect to the region of the image, and use a second scan process on the region of the image if the homogeneous condition is not detected with respect to the region of the image, wherein the first scan process is faster than the second scan process.

Example 15 may include the at least one computer readable storage medium of Example 13, wherein the instructions, when executed, cause a computing device to use one or more atomic operations to update the global CCL table in a shared memory with one or more new connections between components of the image.

Example 16 may include the at least one computer readable storage medium of Example 13, wherein the instructions, when executed, cause a computing device to signal, during a first flattening phase, one or more labels in the global CCL table as being root labels, and convert, during a second flattening phase, the marked root labels into one or more global incremental labels.

Example 17 may include the at least one computer readable storage medium of any one of Examples 13 to 16, wherein the instructions, when executed, cause a computing device to obtain the data associated with the image.

Example 18 may include the at least one computer readable storage medium of Example 17, wherein the data is to include foreground data and partial label data.

Example 19 may include an apparatus to label connected components, comprising a scan module to use a plurality of threads in a processor to conduct a single instruction multiple data (SIMD) scan of data associated with an image, a local table module to generate a plurality of connection tables corresponding to the plurality of threads based on the SIMD scan, and a merge module to use a plurality of threads in the processor to conduct a single phase merge of the plurality of connection tables into a global connected components labeling (CCL) table for the image.

Example 20 may include the apparatus of Example 19, wherein the scan module includes a fast sub-module to, for each of the plurality of threads, use a first scan process on a region of the image if a homogeneous condition is detected with respect to the region of the image, and a generic sub-module to, for each of the plurality of threads, use a second scan process on the region of the image if the homogeneous condition is not detected with respect to the region of the image, wherein the first scan process is faster than the second scan process.

Example 21 may include the apparatus of Example 19, wherein the merge module is to use one or more atomic operations to update the global CCL table in a shared memory with one or more new connections between components of the image.

Example 22 may include the apparatus of Example 19, further including a flattening module to signal, during a first flattening phase, one or more labels in the global CCL table as being root labels, and convert, during a second flattening phase, the marked root labels into one or more global incremental labels.

Example 23 may include the apparatus of any one of Examples 19 to 22, further including a data module to obtain data associated with an image.

Example 24 may include the apparatus of Example 23, wherein the data is to include foreground data and partial label data.

Example 25 may include an apparatus to label connected components, comprising means for performing the method of any one of Examples 7 to 12.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A system comprising:
a display to present an image;
a shared memory; and
a graphics processor including,
a scan module to use a plurality of threads in the graphics processor to conduct a single instruction multiple data (SIMD) scan of data associated with the image including a fast sub-module to, for each of the plurality of threads, use a first scan process on a region of the image if a homogeneous condition is detected with respect to the region of the image, and a generic sub-module to, for each of the plurality of threads, use a second scan process on the region of the image if the homogeneous condition is not detected with respect to the region of the image, wherein the first scan process is faster than the second scan process,
a local table module to generate a plurality of connection tables corresponding to the plurality of threads based on the SIMD scan, and
a merge module to use the plurality of threads in the graphics processor to conduct a single phase merge of the plurality of connection tables into a global connected components labeling (CCL) table for the image, wherein the merge module is to use one or more atomic operations to update the global CCL table in the shared memory with one or more new connections between components of the image.

2. The system of claim 1, wherein the graphics processor further includes a flattening module to signal, during a first flattening phase, one or more labels in the global CCL table as being root labels, and convert, during a second flattening phase, the root labels into one or more global incremental labels.

3. The system of claim 1, further including a data module to obtain the data associated with the image.

4. The system of claim 3, wherein the data is to include foreground data and partial label data.

5. A method comprising:
using a plurality of threads in a processor to conduct a single instruction multiple data (SIMD) scan of data associated with an image including using a first scan process on a region of the image if a homogeneous condition is detected with respect to the region of the image, and using a second scan process on the region of the image if the homogeneous condition is not detected with respect to the region of the image, wherein the first scan process is faster than the second scan process;
generating a plurality of connection tables corresponding to the plurality of threads based on the SIMD scan; and
using the plurality of threads in the processor to conduct a single phase merge of the plurality of connection tables into a global connected components labeling (CCL) table for the image, wherein the single phase merge includes using one or more atomic operations to update the global CCL table in shared memory with one or more new connections between components of the image.

6. The method of claim 5, further including:
signaling, during a first flattening phase, one or more labels in the global CCL table as being root labels; and
converting, during a second flattening phase, the root labels into global incremental labels.

7. The method of claim 5, further including obtaining the data associated with the image.

8. The method of claim 7, wherein the data includes foreground data and partial label data.

9. At least one non-transitory computer readable storage medium comprising a set of instructions which, when executed by a computing device, cause the computing device to:
use a plurality of threads in a processor to conduct a single instruction multiple data (SIMD) scan of data associated with an image wherein the scan of the data includes using a first scan process on a region of the image if a homogeneous condition is detected with respect to the region of the image, and using a second scan process on the region of the image if the homogeneous condition is not detected with respect to the region of the image, wherein the first scan process is faster than the second scan process;
generate a plurality of connection tables corresponding to the plurality of threads based on the SIMD scan; and
use the plurality of threads in the processor to conduct a single phase merge of the plurality of connection tables into a global connected components labeling (CCL) table for the image, wherein the instructions, when executed, cause the computing device to use one or more atomic operations to update the global CCL table in a shared memory with one or more new connections between components of the image.

10. The at least one computer readable storage medium of claim 9, wherein the instructions, when executed, cause the computing device to:
signal, during a first flattening phase, one or more labels in the global CCL table as being root labels; and
convert, during a second flattening phase, the root labels into one or more global incremental labels.

11. The at least one computer readable storage medium of claim 9, wherein the instructions, when executed, cause the computing device to obtain the data associated with the image.

12. The at least one computer readable storage medium of claim 11, wherein the data is to include foreground data and partial label data.

13. An apparatus comprising:
a shared memory; and
a processor including,
a scan module to use a plurality of threads in the processor to conduct a single instruction multiple data (SIMD) scan of data associated with an image including a fast sub-module to, for each of the plurality of threads, use a first scan process on a region of the image if a homogeneous condition is detected with respect to the region of the image, and a generic sub-module to, for each of the plurality of threads, use a second scan process on the region of the image if the homogeneous condition is not detected with respect to the region of the image, wherein the first scan process is faster than the second scan process;
a local table module to generate a plurality of connection tables corresponding to the plurality of threads based on the SIMD scan; and
a merge module to use the plurality of threads in the processor to conduct a single phase merge of the plurality of connection tables into a global connected components labeling (CCL) table for the image, wherein the merge module is to use one or more atomic operations to update the global CCL table in the shared memory with one or more new connections between components of the image.

14. The apparatus of claim 13, further including a flattening module to signal, during a first flattening phase, one or more labels in the global CCL table as being root labels, and convert, during a second flattening phase, the root labels into one or more global incremental labels.

15. The apparatus of claim 13, further including a data module to obtain the data associated with the image.

16. The apparatus of claim 15, wherein the data is to include foreground data and partial label data.

\* \* \* \* \*